Oct. 4, 1949.　　　　　G. J. KENNEDY　　　　　2,483,910
CAPACITOR END FILLING MACHINE
Filed Jan. 16, 1945　　　　　　　　　　　　　　4 Sheets-Sheet 1

INVENTOR
GILBERT J. KENNEDY
BY
ATTORNEY

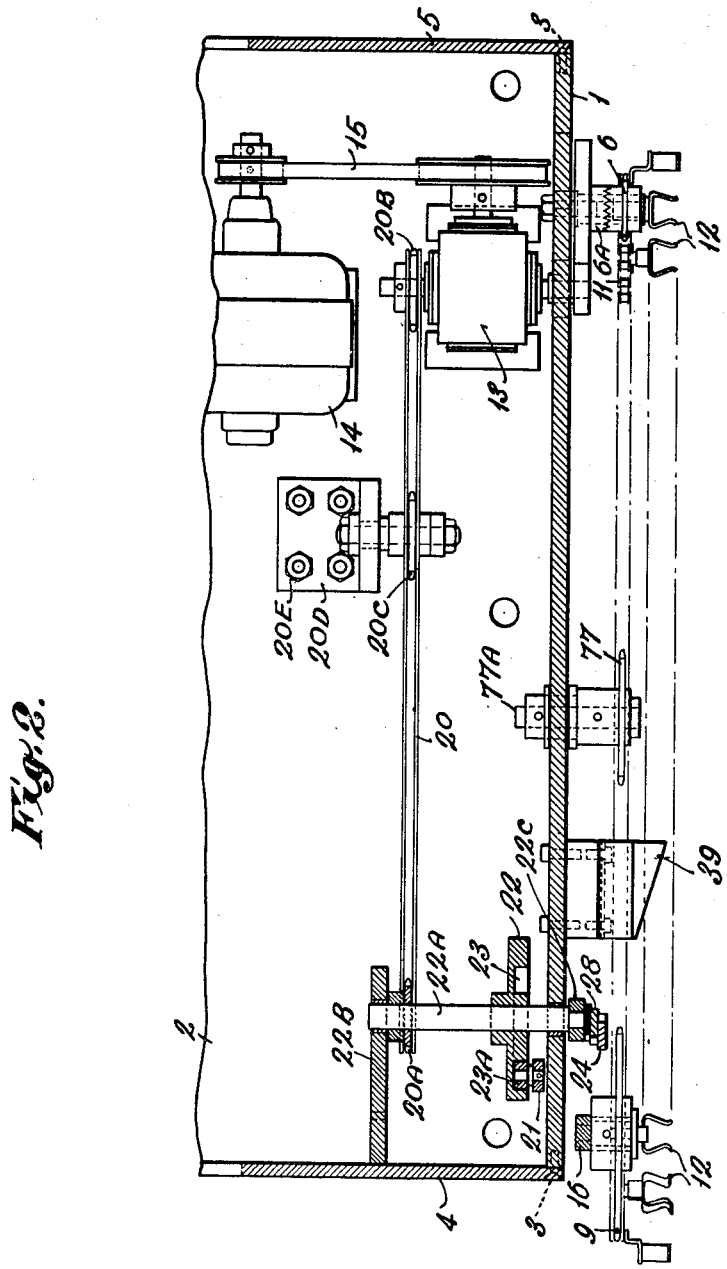

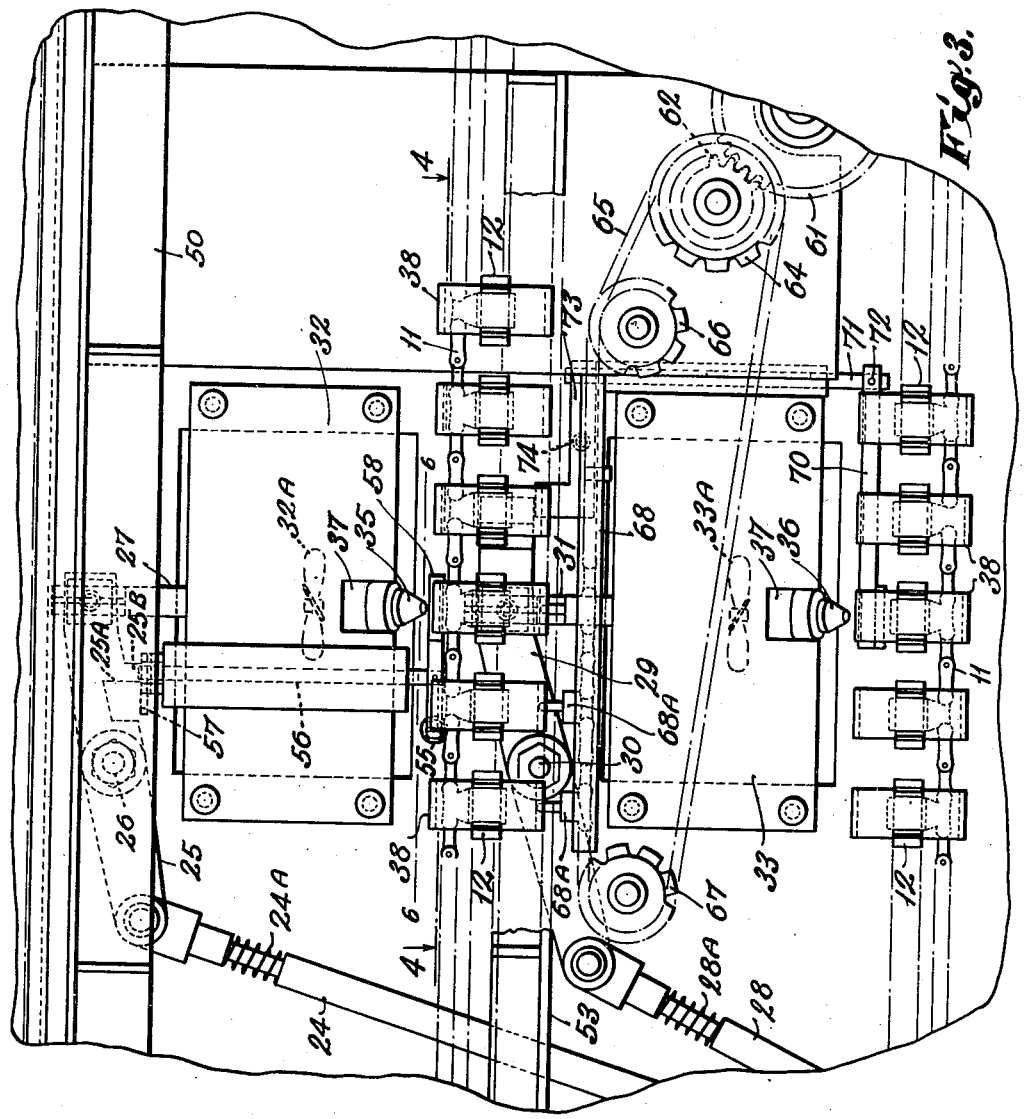
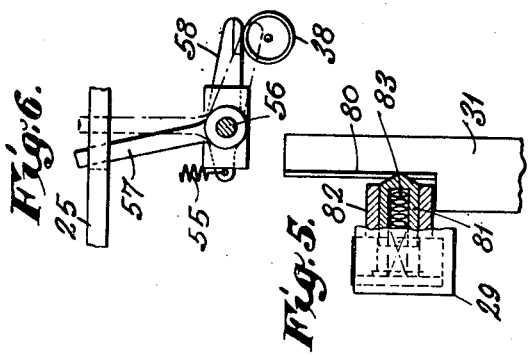

Oct. 4, 1949.    G. J. KENNEDY    2,483,910
CAPACITOR END FILLING MACHINE
Filed Jan. 16, 1945    4 Sheets-Sheet 4
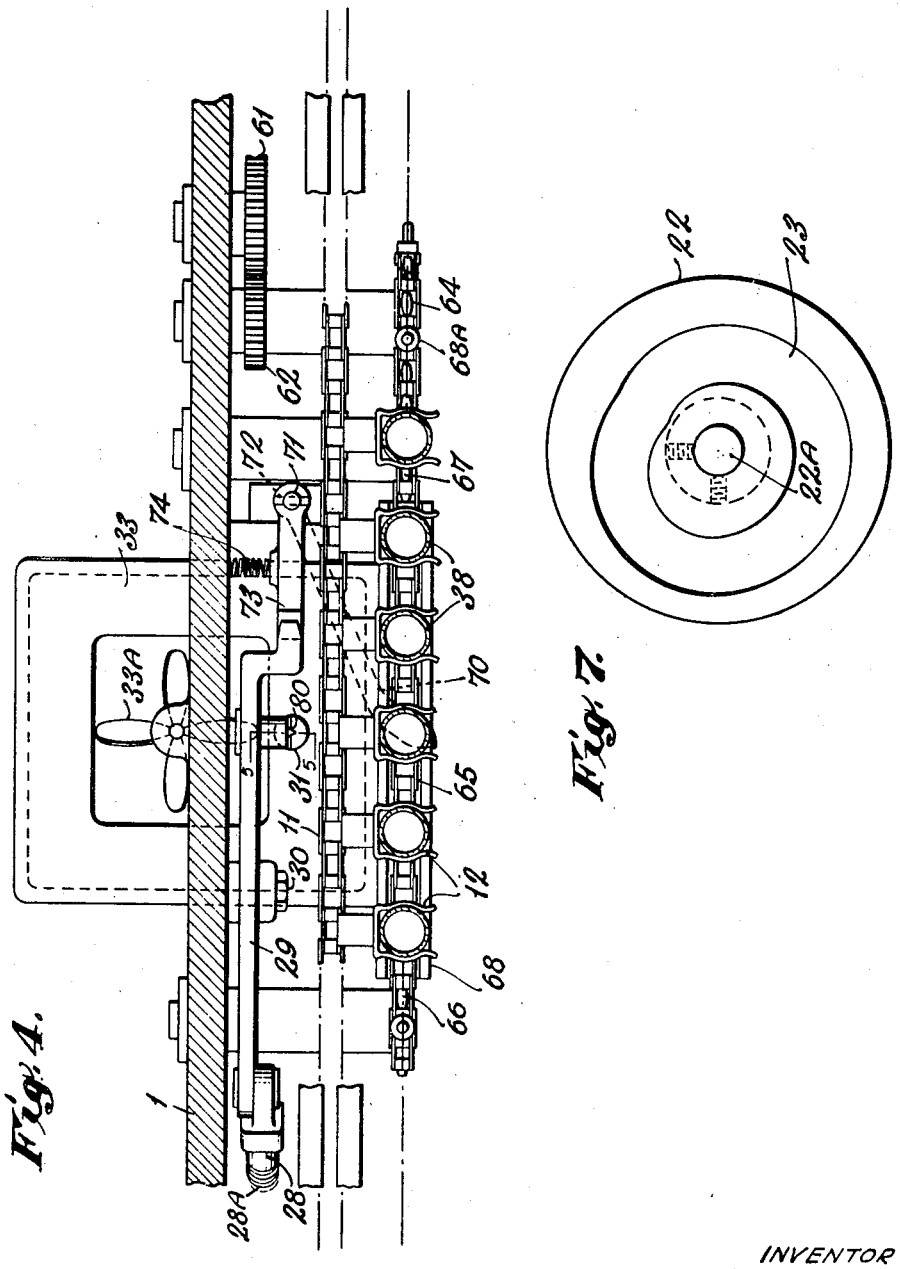
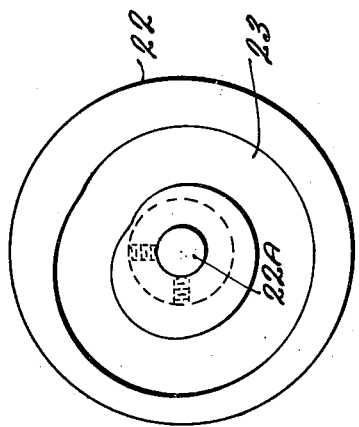
INVENTOR
GILBERT J. KENNEDY
By H.S. Grover
ATTORNEY Patented Oct. 4, 1949

2,483,910

UNITED STATES PATENT OFFICE 2,483,910

CAPACITOR END FILLING MACHINE

Gilbert J. Kennedy, Philadelphia, Pa., assignor to Radio Corporation of America, a corporation of Delaware Application January 16, 1945, Serial No. 573,131

9 Claims. (Cl. 91—43)

This invention relates to a new and useful conveying and capacitor end filling machine which is particularly adapted for sealing the ends of rolled electrical capacitors.

An object of this invention is to provide a machine which will improve and increase the production of electrical capacitors.

A feature of this invention is the arrangement of a continuous moving chain which moves the capacitor to a device which centers the capacitor units in a tube and then conveys them to a position whereat a small quantity of thermoplastic material seals one end of the unit and then turns the capacitor over and places it in a position whereat another device deposits a drop of material which seals the other end of the unit, thereby protecting the capacitor unit at its end against the entry of moisture.

The capacitor units which are to be built by this machine are well known in the art and consist of wound paper and metallic foils separated from each other which when wound are placed in a shell or insulating tube with connection leads extending out at each end of the tube.

This invention will best be understood by referring to the accompanying drawings in which:

Fig. 2 is a longitudinal section taken on line 2—2 of Fig. 1,

Fig. 3 is an enlarged front elevation showing a portion of Fig. 1,

Fig. 4 is a cross section on line 4—4 of Fig. 3,

Fig. 5 is a sectional detail taken on line 5—5 of Fig. 4 showing a part of the mechanism for operating the wax deposit valves, Fig. 6 is a front elevation partly in section at line 6—6 of Fig. 3, showing another part of the mechanism for operating the wax deposit valves, and Fig. 7 is a detailed front elevation of the operating cam.

Figure 1:
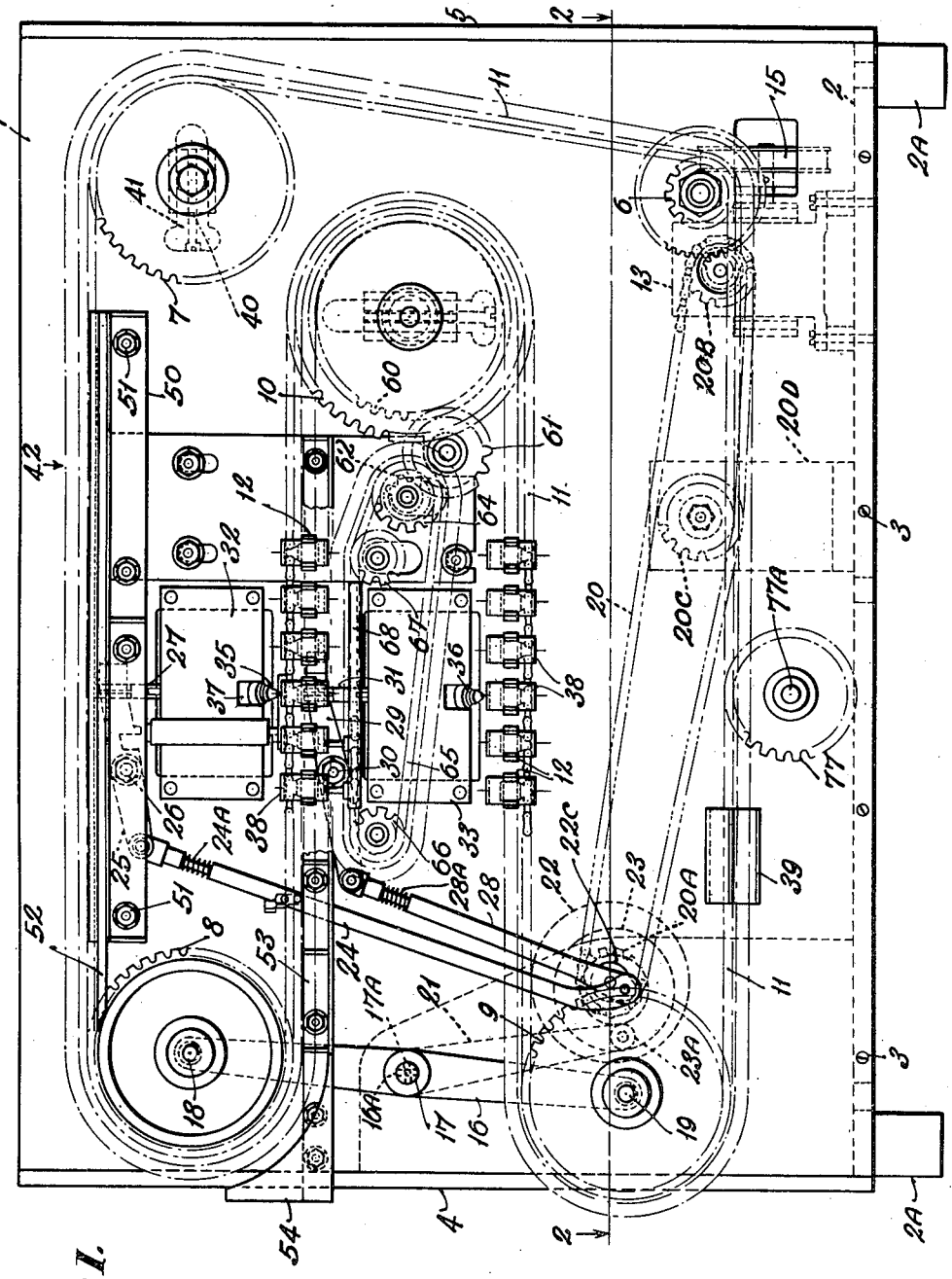
Fig. 1 is a front elevation of the machine of this invention.

Referring now to the drawings, a support panel 1 is secured to a base 2 by means of a plurality of screws 3. The base 2 is provided with four legs 2A which are of proper length to provide efficient operation. Two triangular shaped end members 4 and 5 are secured to panel 1 by screws 3. At each of the four corners of panel 1, there are located chain sprockets 6, 7, 8 and 9. The sprockets 8 and 9 are mounted on an oscillating arm 16. A fifth chain sprocket 10 is located on the right side of panel 1 intermediate sprockets 6 and 7. A continuous roller chain 11, which is similar to that used in bicycles, is arranged to mesh with the teeth of all of the five above mentioned sprockets. A plurality of U-shaped spring clips 12 are secured to each one of the links of chain 11, the clips being made up in a different number of suitable sizes to engage the capacitors which are to be processed by the machine of this invention. The sprocket 6 is rotated through a gear reduction unit 13 by a motor 14, the gear reduction unit and the motor 14 being coupled together by means of a V belt 15, the preferred arrangement being such that the chain 11 moves at a sufficient speed to process approximately 30 capacitor units per minute. An oscillating arm 16 is provided on the front of panel 1 and is pivoted by means of a pivot shaft 17 to panel 1 in order that a portion of chain 11 will intermittently stop to permit the deposit of a small quantity of wax on a capacitor while the remainder of the chain continues to move at a constant speed. The ends of the oscillating arm 16 are provided with studs 18 and 19 upon which rotate sprockets 8 and 9 respectively. The operation of the oscillating arm 16 is accomplished by the movement of a chain 20 located in the rear of the panel which is connected for rotation through sprockets 20A and 20B with the gear reduction unit 13. A cam lever 21 connects to a cam wheel 22 which is shown in detail in Fig. 7. The cam has a grooved curved cam track 23, a cam shaft 22A is mounted for rotation with sprockets 20A by bracket 22B. A roller 23A runs in track 23 and is provided with a pivot bearing for moving lever 21. The chain 20 is maintained in a tight operating condition by an idle sprocket 20C which is supported by an angular bracket 20D secured to base 2 by bolts 20E. The cam lever 21 is connected to rocker shaft 17 by a pin 17A. The oscillating arm 16 is also connected to shaft 17 by a pin 16A. Cam shaft 22A extends beyond the face of cam 22 and also panel 1. A shouldered portion on shaft 22A has secured thereto an eccentric crank arm 22C. Two links 24 and 28 are actuated by crank arm 22C. The link 24 operates a rocker arm 25, which is pivoted by pivot 26 secured to panel 1. Arm 25 has a slot 25A, a depending extension portion 25B, and a plunger 27 located at the end opposite the junction of link 24. The second link 28 connects with a second rocker arm 29 which is pivoted by a pivot 30 secured to panel 1. A second plunger 31 is secured to rocker arm 29. A wax reservoir 32 is located adjacent plunger 27 and a second wax reservoir 33 is located adjacent plunger 31 and are shown in more detail by Figs. 3 and 4. Both reservoirs 32 and 33 are electrically heated by any suitable means such as an electric heater (not shown) which surrounds the outer casing of the reservoir, the arrangement being such that the sealing wax, which is to be located therein, is maintained in a molten state at approximately 250° C. and agitated by a paddle or similar device 32A and 33A. Directly below plunger 27 there is nozzle 35, and directly below plunger 31 there is a second nozzle 36. The nozzles 35 and 36 are connected to reservoirs 32 and 33 respectively by suitable connection means such as pipe 37. The position of the nozzles 35 and 36 is such that they are directly above one of the capacitor units 38 when the two portions of the chain below nozzles 35 and 36 intermittently stops its rotation.

At the upper portion of panel 1 there is arranged a small angular platform 50 which is secured by means of a plurality of bolts and nuts 51. The angular member 50 is located directly below the chain 11 in a position such as to prevent the paper wound capacitor unit from dropping out of the shell 38. A guide channel extension portion 52 extends beyond angle 50 to insure the capacitor unit to be maintained in this proper position within the shell 38 before passing around the sprocket 8. A second guide channel member 53 is located on the front of panel 1 in a position which is intermediate sprockets 8 and 9. To the right of sprocket 8 there is secured to member 53 a quadrant section 54 which follows the contour of chain 11 as it passes around the sprocket 8. The location being such as to prevent the wound capacitor unit from dropping out of the shell 38 at this point and to position the shell and unit properly on the chain so that the wax will be able to enter the shell.

During the operation of this machine it frequently happens that an operator will neglect to place a capacitor within one of the clips provided for this purpose. It is therefore desirable to have the device of this invention arranged so as not to eject a quantity of wax when a capacitor is not in one of the clips provided for this purpose. A bell crank having arms 57 and 58 is provided to prevent any ejection of wax when a capacitor is not in its respective position in clip 12. Arm 58 is located just above chain 11 and below the adjacent nozzle 35, as shown by Figs. 3 and 6. A movable vertical rod 56 is secured between arms 57 and 58. Arm 57 normally is arranged to lie within a slot 25A of arm 25 which is connected to a plunger 27. If by chance a clip 12 does not have a capacitor unit in position to receive a quantity of wax from nozzle 35, the plunger 27 will then not operate because spring 55 forces arm 58 in the zone normally occupied by the missing unit. In this position arm 58 rotates vertical rod 56, which in turn moves arm 57 to the right as indicated by the dot and dash lines in Fig. 6. In this latter position arm 57 will move away from the slot 25A in arm 25 and will engage the depending extension portion 25B which will hold the plunger 27 up to prevent ejection of any wax. A heavy helical spring 24A takes up the motion between members 24 and 25.

In order to further retain the capacitor units in position while passing around reservoirs 32 and 33 a secondary belt or conveyer member is provided as shown in detail by Figs. 3 and 4. The secondary conveyer is actuated by means of a gear 60, shown in Fig. 1, which rotates with sprocket 10 and meshes with a second gear 61, a pinion 62, and an intermediate sprocket 64 to actuate a sprocket 66. The sprocket 64 is arranged to move a second chain 65 which has arranged on each side of reservoir 33 idler sprockets 66 and 67. The chain 65 moves through a slotted capacitor guide member 68. Certain links of chain 65 have mounted thereon capacitor support pins 68A to hold the capacitor unit in a central position until the molten wax solidifies enough to hold.

When the clip 12, having no capacitor unit located therein, reaches the second nozzle 36, wax ejection is again prevented by another mechanism including a movable arm 70 which is located directly below the reservoir 33. Arm 70 is secured to a movable shaft 71 pinned at 72. This shaft 71 has, at its upper portion, a second arm 73 which prevents the actuation of an arm 29 to operate plunger 31. The arrangement of the mechanism is such that if a capacitor unit is omitted (as shown by the dash line in the central portion of Fig. 4) the plunger 31 will not operate to eject a quantity of wax through nozzle 36 because in this position a spring 74 will force arm 73 to the position shown in Fig. 4 and will block the normal downward movement of arm 29. When a capacitor is in a clip and it is positioned to receive the wax arms 70 and 72 both move to the rear by the displacement of shell 38 compressing spring 74. Thereby arm 29 and plunger 31 can move downward to eject the wax. A heavy spring 28A takes up the lost movement between members 28 and 29.

In order that the device of this invention will not actuate should the wax become solidified in reservoirs 32 or 33, a sliding device (shown in detail in Fig. 5) is provided on the upper portion of plungers 27 and 31. This is accomplished by having the upper portion of plungers 27 and 31 cut away and provided with a V slot 80 in which rides a spring tensioned member 81 which is secured to a portion of a rod 82. The spring tension is provided by a spring 83.

It will be noted that in the operation of this device, arrangement is made so that after capacitor 38 dwells long enough to receive a quantity of thermoplastic material from the nozzle 35, it will then pass over the periphery in sprocket 10 and in so doing the capacitor turns completely over so that when it reaches a position near nozzle 36 the extreme end of the unit will be in a position to receive a drop of sealing compound. Located slightly to the right of sprocket 9 there is a capacitor ejecting member 39 which extends out in front of the channel. Sprocket 7 is provided with a slotted portion 40 which permits the lateral member of a bearing 41 to loosen or tighten the chain 11 for the best operating tension. The slack is taken up in chain 11 by a sprocket 77 which is mounted in front of panel 1 and rotates on a shaft 77A. Adjustment of chain 11 relative to the position of cam track 23 is made by a split toothed bushing 6A which surrounds the shaft for sprocket 6.

When operating this device, with the chain 11 moving, the operator places the unsealed capacitor units 38 in shells 39 in the clips 12 at a loading point 42. The loading point 42 will be anywhere along the top of the chain between sprockets 7 and 8. The capacitors which are to be loaded in the machine will generally be in two separate pieces, that is, the wound paper and metal foil capacitor units and outside shells 38. In some applications however, the shell and the capacitor unit will be secured in place before sealing. The capacitor units and shells then move along with chain 11 around driving sprockets 8 and 9. In the meantime sprocket 8 by movement of arm 16 moves to the left along a portion of the chain and thus brings the portions intermediate sprockets 8, 9 and 10 in a position of rest when arm 16 reaches the same speed as that at which the chain is traveling. Simultaneously with this operation, sprocket 9 moves to the right and the shaft 22A rotates crank arm 22C which in turn is linked with arms 24 and 28 and by the upward movement thereof rocks the right hand portion of rocker arms 26 and 29 downward causing plungers 27 and 31 to open a valve in nozzles 35 and 36 which places a drop of wax and seals the end of the capacitors. Links 24 and 28 are provide with heavy helical springs 24A and 28A respectively which exert the pressure required to operate plungers 27 and 31. After the wax is placed in the top ends of the capacitor units, sprocket 8 then moves to the right and sprocket 9 to the left, thus starting the last mentioned portions of the chain to move again twice as fast as the top, bottom and right hand portions of the chain 11, which always moves uniformly carrying with it the capacitors 38 which then rotate around the outer right periphery of sprocket 10 and in so doing reverses the position of the capacitors so that the opposite end is in position to receive wax from nozzle 35. The sprocket 8 then moves to the left and sprocket 9 to the right, and the operation of dropping the sealing compound is repeated by motion of plunger 27 and rocker arm 25. The intermittent stationary portion of the chain moves when sprocket 9 moves to the left and continues this movement until the capacitor shells 38 are ejected by means of the slant on member 39, the capacitor units then drop into any suitable container, not shown.

As mentioned above, if the sealing compound is not in sufficiently molten state to flow, then the springs will compress and no action will result. At first only one end of the capacitors will be sealed, that is, until a sufficient number pass around sprocket 10. Then the other end of the units will be sealed simultaneously with the first top ends to be sealed. The levers 57 and 73 are provided to operate in the path of the chain 11 to hold back the wax valve plungers when no unit is present in the chain, thus preventing a quantity of wax or sealing compound from being ejected.

Although this invention has been described in connection with the conveying and building of capacitors, it should be understood that the invention is such as to be adapted to other electrical devices and therefore should not be limited precisely thereto.

What I claim is:

1. A device for conveying electrical elements comprising a support member, a plurality of chain sprockets mounted for rotation on said support member, a continuous chain engaging the teeth of said sprockets, support means secured to said chain to receive the electrical elements an oscillating arm pivoted on said support member and supporting some of said sprockets, means for moving and reversing the position of said electrical elements, and means for moving said oscillating arm for intermittently stopping movement of one portion of said chain while another portion moves.

2. A machine for sealing the ends of electrical capacitors comprising a support member, a plurality of sprockets mounted for rotation on said support member, a continuous chain engaging the teeth of said sprockets, support means secured to said chain to receive said electrical capacitors, means for moving said chain and means for intermittently stopping the movement of one portion of the chain while a quantity of thermoplastic material is placed on one end of one of said capacitors, and means for moving and reversing the position of said capacitors so that a like quantity of thermoplastic material is placed on the other end of said one capacitor.

3. A machine for sealing the ends of electrical capacitors to prevent entry of moisture comprising a support member, a plurality of sprockets mounted for rotation on said support member, a continuous chain engaging the teeth of said sprockets, support means secured to said chain to receive said electrical capacitors, means for moving said chain and means including an oscillating arm for intermittently stopping the movement of one portion of the chain while a quantity of thermoplastic material is placed on one end of one of said capacitors, and means for reversing the position of said capacitors so that a like quantity of thermoplastic material is placed on the other end of said one capacitor.

4. A machine for sealing the ends of electrical capacitors comprising a support member, an oscillating arm pivoted on said support member, three sprockets mounted for rotation on said support member and two sprockets mounted on said oscillating arm, a continuous chain engaging the teeth of all of said sprockets, support means secured to said chain to receive said electrical capacitors, means for moving said chain and means for actuating said oscillating arm to intermittently stop the movement of one portion of the chain while a quantity of molten sealing compound is placed on one end of one of said capacitors, and one of said three sprockets being mounted with respect to the other sprockets in such manner as to reverse the position of said capacitors so that a like quantity of sealing compound is placed on the other end of said one capacitor.

5. A machine for sealing an electrical capacitor unit within a tube by closing the ends thereof comprising a support member, a plurality of sprockets mounted for rotation on said support member, a continuous chain engaging the teeth of said sprockets, support means secured to said chain to receive said electrical capacitors, guide means to retain said capacitor units in a central position within said tube, means for moving said chain and means for intermittently stopping the movement of one portion of the chain while a quantity of sealing compound is placed on one end of one of said capacitors, and means for reversing the position of said capacitors so that a like quantity of sealing compound may be placed on the other end of said one capacitor.

6. Apparatus for sealing the ends of an electrical capacitor comprising a conveyer, a first sealing compound feeding device disposed above said conveyer for placing a quantity of sealing compound in an end of said electrical capacitor, means for reversing the position of said electrical capacitor on said conveyer, and a second sealing compound feeding device disposed above said conveyer and below said first sealing compound feeding device, whereby the other end of said electrical capacitor is sealed.

7. A device for conveying electrical elements comprising a support member, a plurality of chain sprockets mounted for rotation on said support member, a continuously moving chain for engaging the teeth of said sprockets for rotation therewith, a plurality of spaced clips secured to said chain to receive said electrical elements an oscillating arm pivoted on said support member and supporting some of said sprockets, means for moving and reversing the position of said electrical elements, and means for moving said oscillating arm for intermittently stopping movement of one portion of said continuously moving chain while another portion moves.

8. A machine for sealing the ends of electrical devices comprising a support, a plurality of members mounted for rotation on said support, a continuous moving conveyer for engaging said members for rotation therewith, support means to secure to said continuously moving conveyer to receive said electrical devices, means for moving said continuousely moving conveyer, and means for intermittently stopping the movement of one portion of said conveyer while a quantity of moulten sealing material is placed on one end of one of said electrical devices, and means for moving and reversing the position of said electrical devices so that a like quantity of sealing material is placed on the other end of said one device.

9. A machine for sealing the ends of electrical devices comprising a support, a plurality of members mounted for rotation on said support, a continuous moving conveyer for engaging said members for rotation therewith, support means secured to said continuously moving conveyer to receive said electrical devices, means for moving said continuously moving conveyer, means for intermittently stopping the movement of one portion of said conveyer while a quantity of moulten sealing material is placed on one end of one of said electrical devices, means for moving and reversing the position of said electrical devices so that a like quantity of sealing material is placed on the other end of said one device, and means to prevent the ejection of moulton sealing material when said one electrical device is not in its respective sealing position on said conveyer.

GILBERT J. KENNEDY.

REFERENCES CITED

The following references are of record in the file of this patent:

UNITED STATES PATENTS

| Number | Name | Date |
|---|---|---|
| 1,488,251 | House | Mar. 25, 1924 |
| 2,227,145 | Lex et al. | Dec. 31, 1940 |
| 2,277,309 | Doll | Mar. 24, 1942 |
| 2,314,154 | McCoy | Mar. 16, 1943 |
| 2,359,838 | Gladfelter et al. | Oct. 10, 1944 |
| 2,375,805 | McVey | May 15, 1945 |